United States Patent
Nakazawa

(10) Patent No.: US 6,559,862 B1
(45) Date of Patent: May 6, 2003

(54) INFORMATION PROCESSING TERMINAL AND ADVERTISING SYSTEM USING THE INFORMATION PROCESSING UNIT

(75) Inventor: Hidenori Nakazawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/573,205

(22) Filed: May 19, 2000

(30) Foreign Application Priority Data

May 20, 1999 (JP) ............................................ 11-140468

(51) Int. Cl.[7] .......................... G06F 3/00; G06F 15/16; G06F 3/14
(52) U.S. Cl. ........................ 345/738; 345/838; 705/14; 709/217
(58) Field of Search ................................ 345/733, 838, 345/835, 966, 738, 740, 744, 745, 747, 854, 760, 748; 705/14; 707/501.1; 715/501.1; 709/201, 217, 203, 208, 213, 216, 219

(56) References Cited

U.S. PATENT DOCUMENTS

| | | | |
|---|---|---|---|
| 5,901,228 A | * | 5/1999 | Crawford ................. 709/217 X |
| 5,973,692 A | * | 10/1999 | Knowlton et al. ........... 345/835 |
| 6,009,410 A | * | 12/1999 | LeMole et al. ................ 705/14 |
| 6,138,150 A | * | 10/2000 | Nichols et al. .............. 709/219 |
| 6,225,997 B1 | * | 5/2001 | Mitsuoka et al. ....... 709/203 X |
| 6,247,047 B1 | * | 6/2001 | Wolff .......................... 709/219 |
| 6,269,395 B1 | * | 7/2001 | Blatherwick et al. ........ 709/219 |

FOREIGN PATENT DOCUMENTS

JP 11-17633 1/1999

\* cited by examiner

*Primary Examiner*—Raymond J. Bayerl
(74) *Attorney, Agent, or Firm*—Sughrue Mion, PLLC

(57) ABSTRACT

A information processing terminal includes a memory unit which stores at least one set of icon data and contents for off-line communication, an information processing unit which determines whether the terminal is under on-line or off-line condition, and a display unit which displays, based on the icon data, an icon in which both two type of link information is embedded. One is for linking to said contents for off-line communication, and another is for linking to outside contents for on-line communication. The terminal accesses the outside contents for on-line communication in response to clicking the icon by a user, and the display unit displays the outside contents, when the information-processing unit determines that the terminal is under on-line condition. On the other hand, the terminal accesses the contents for off-line communication in response to clicking the icon by the user, and the display unit displays the contents for off-line communication, when the information-processing unit determines that the terminal is under off-line condition.

10 Claims, 6 Drawing Sheets

INFORMATION PROCESSING TERMINAL AND ADVERTISING SYSTEM USING THE INFORMATION PROCESSING UNIT

BACKGROUND OF THE INVENTION

The present invention relates to advertising system for use on a communication network, and an information processing terminal and a center for use in this advertising system.

In recent years, as browser-equipped information processing terminal have been improved and become extensively available, web sites have come to be accessed by a wide spectrum of people and proved highly effective as advertising media.

Some web pages carry advertising graphics linked to specific web pages, for instance, the respective advertisers' web pages. If a user clicks one of such advertising graphics, the terminal will access the linked web page, and the user will take a look at the accessed web page. On such a linked web page, more details of the advertisement are displayed.

The Japanese Patent Application Laid-open No. Hei 11-17633 discloses a conventional advertising system by which an advertising graphic with embedded linked information is displayed on the display unit of a user, who is expected to click of a pertinent icon.

This conventional advertising system includes user-operable terminal, a broadcasting center and web servers for storing web pages, and each of these constituent elements is connected to communication networks including the Internet and public communication-line networks.

The broadcasting center includes a earth station and a communication satellite, the latter broadcasting programs in digital signals under the control of the earth stations.

The terminal receives the digital signals, and supplies pictures to its display unit and audio contents to its loudspeaker. The terminal is further provided with its own specification browser for viewing the web pages on the display.

In this conventional advertising system, the digital signals sent from the communication satellite include icon data in addition to broadcast signals. Icons are temporarily stored in a prescribed memory area of the terminal, and displayed on the unit at predetermined timings. These icons, each of which is composed of graphics, work as advertisements.

In each of these icons is embedded the web server address indicated in a URL or information for requesting the broadcasting center to transmit detailed advertising information.

If the user clicks the icon in which the web server address is embedded as link information, the terminal will access the web server indicated by the link information, and displays the pertinent web page on its display unit. This web page carries detailed information of the advertisement which the clicked icon represents.

Or if the user clicks an icon in which is embedded information for requesting the broadcasting center to transmit detailed advertising information as link information, the terminal will ask the broadcasting center to transmit detailed advertising information and at the same time display that detailed advertising information received from the communication satellite via the broadcasting center.

The above-described conventional advertising system according to involves the following problem.

With this prior art advertising system, unless the terminal is connected to a communication network or unless the terminal can receive digital broadcast signals from the communication network, the user cannot obtain detailed advertising information even if he or she clicks the right icon.

SUMMARY OF THE INVENTION

An object of the present invention is to provide an advertisement system with a high level of advertising effectiveness.

According to an aspect of the present invention, there is provided a information processing terminal comprising: a memory unit which stores at least one set of icon data and contents for off-line communication; an information processing unit which determines whether said terminal is under on-line or off-line condition; and a display unit which displays, based on said icon data, an icon in which both two type of link information is embedded, one of said link information being for linking to said contents for off-line communication, and another being for linking to outside contents for on-line communication, wherein said terminal accesses said outside contents for on-line communication in response to clicking said icon by a user, and said display unit displays said outside contents for on-line communication, when said information processing unit determines that said terminal is under on-line condition, and wherein said terminal accesses said contents for off-line communication in response to clicking said icon by said user, and said display unit displays said contents for off-line communication, when said information processing unit determines that said terminal is under off-line condition.

According to other aspect of the present invention, these is provided an advertising: system comprising: a communication network; a information processing terminal which includes a memory unit which stores at least one set of icon data and contents for off-line communication, an information processing unit which determines whether said terminal is under on-line or off-line condition, and a display unit which displays, based on said icon data, an icon in which both two type of link information is embedded, one of said link information being for linking to said contents for off-line communication, and another being for linking to contents for on-line communication; and a center which stores said on-line contents and is connected to said communication network; wherein said terminal accesses said contents for on line communication in response to clicking said icon by a user, and said display unit displays said contents for on-line communication, when said information processing unit determines that said terminal is under on-line condition, and wherein said terminal accesses said contents for off-line communication in response to clicking said icon by said user, and said display unit displays said contents for off-line communication, when said information processing unit determines that said terminal is under off-line condition.

BRIEF DESCRIPTION OF THE DRAWINGS

These and other objects, features and advantages of the invention will become more apparent from the following detailed description when taken in conjunction with the accompanying drawings, in which.

DETAILED DESCRIPTION OF THE PREFERRED EMBODIMENTS

Preferred embodiments of the present invention will be described in detail below with reference to the accompanying drawings.

Figure 1:
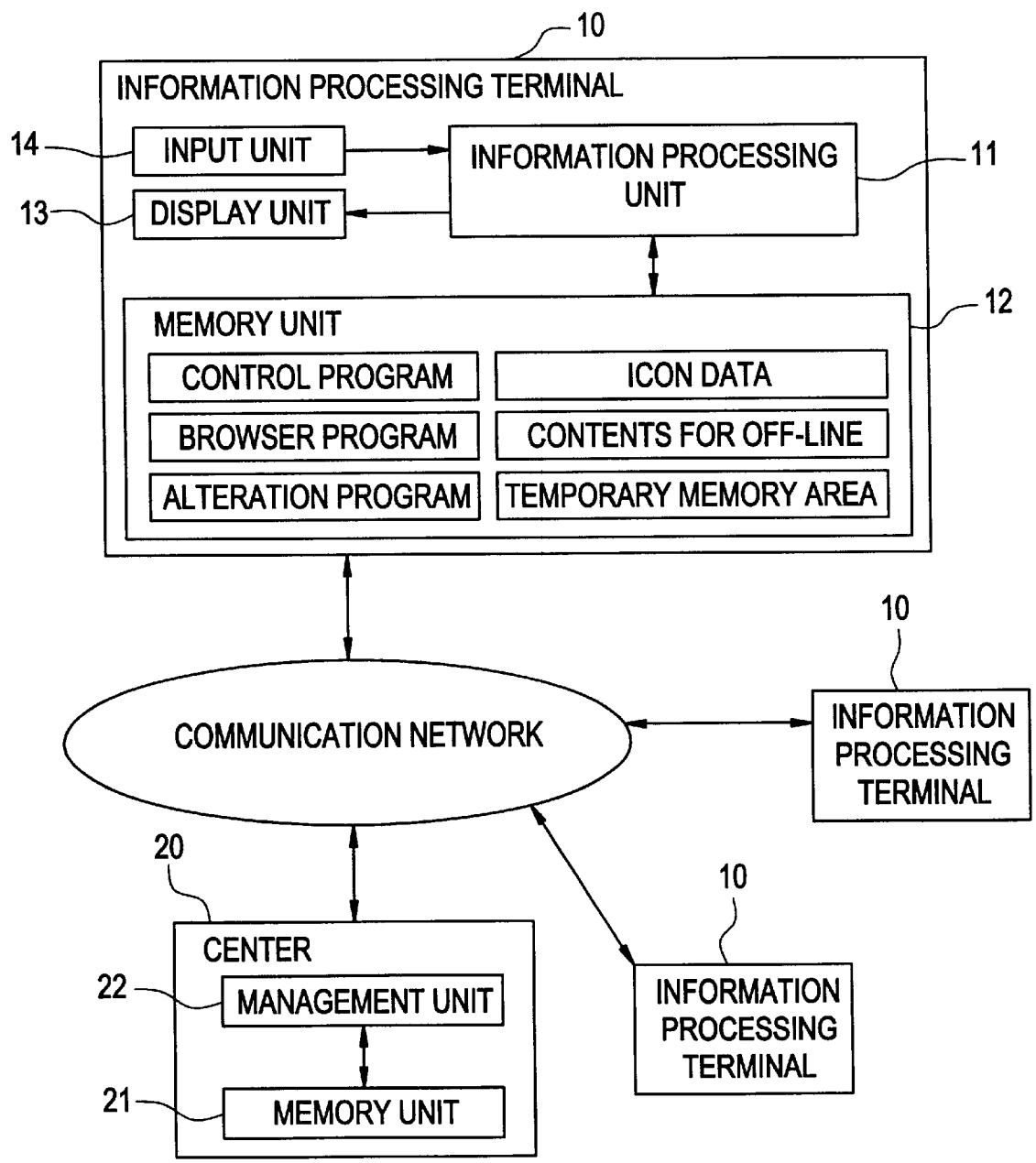
FIG. 1 is a block diagram illustrating a first embodiment of an advertising system of the present invention.

Referring to FIG. 1, advertising system of the first embodiment of the present invention includes a plurality of information processing terminals 10, an advertisement center 20, and communication networks such as Internet and public communication-line networks.

The center 20, which includes web server, satellite broadcasting center, or both of them, includes a memory unit 21 and a management unit 22. The memory unit 21 stores contents such as web documents or a broadcasting program (hereinafter referred to as on-line contents). Functions of the management unit 22 are described later. Each of the information processing terminals 10, for instance, a personal computer or a broadcasting receiver, includes an information processing unit 11, a memory unit 12, a display unit 13 and an input unit 14.

The information-processing unit 11 controls the entire terminal 10 and a communication between the terminal 10 and the server 20.

The memory unit 12 stores a browser program, icon data of at least one icon which is comprised of an advertising graphic and displayed on the display unit 13, contents for off-line communication (hereinafter referred to as off-line contents), an alteration program and a control program. Further, the memory unit 12 has a temporary memory area which stores the on-line contents downloaded or transmitted from the center 20 via the communication network.

The off-line contents are accessed by the browser, when the terminal 10 is not connected to the center 20 (the terminal 10 is under off-line condition). On the other hand, the on-line contents are accessed by the browser, when the terminal 10 is connected to the center 20 (the terminal is under on-line condition).

The icon, which works as advertisements on the display unit 13, embeds both two type of link information.

One is for linking to the on-line contents such as a Uniform Resource Locator (URL) or information for requesting the broadcasting center to transmit on-line contents. The on-line contents include information which is related to the advertisements advertised by the icon, for instance, more detail of the advertisements.

The other is for linking to the off-line contents, which also includes information related to the advertisements.

When a user clicks the icon by using the input unit 14, the terminal 10 displays the on-line or the off-line contents corresponding to the clicked icon.

It is desirable that the icon data and the corresponding off-line contents are stored in the memory unit 12 before shipping to a customer, or shipping from a factory. In this case, a user who has just bought the terminal 10 or who uses the terminal 10 without connecting it to a communication network can be provided with an opportunity to reference the off-line contents, detailed advertising information, matching an icon by only clicking that icon.

Here, The management unit 22 in the center 20 is described in detail.

The management unit 22 transmits instructions to the terminal 10 at a prescribed timing under on-line condition. One is for adding new icon data and off-line contents corresponding to the icon data to the memory unit 12. Another is for updating icon data and off-line contents stored in the memory unit 12. At the same time as transmitting these instructions, the management unit 22 also transmits the new or updated icon data and off-line contents to the terminal 10. These icon data and off-line contents, which are transmitted to the terminal 10, are stored in the memory unit 22 in the center 20. Further, another instruction is for deleting them in the memory 12 of the terminal 10. The adding, updating, and deleting processes are carried out by the information-processing unit 11 in accordance with the alteration program and based on the received instruction from the center 20. Further, the management unit 22 acquires access-history of each version of each icon at each of the terminals 10, and stores them in the memory unit 21.

Next, the operation of this first embodiment of the invention will be described with reference to FIGS. 1 and 2.

Figure 2:
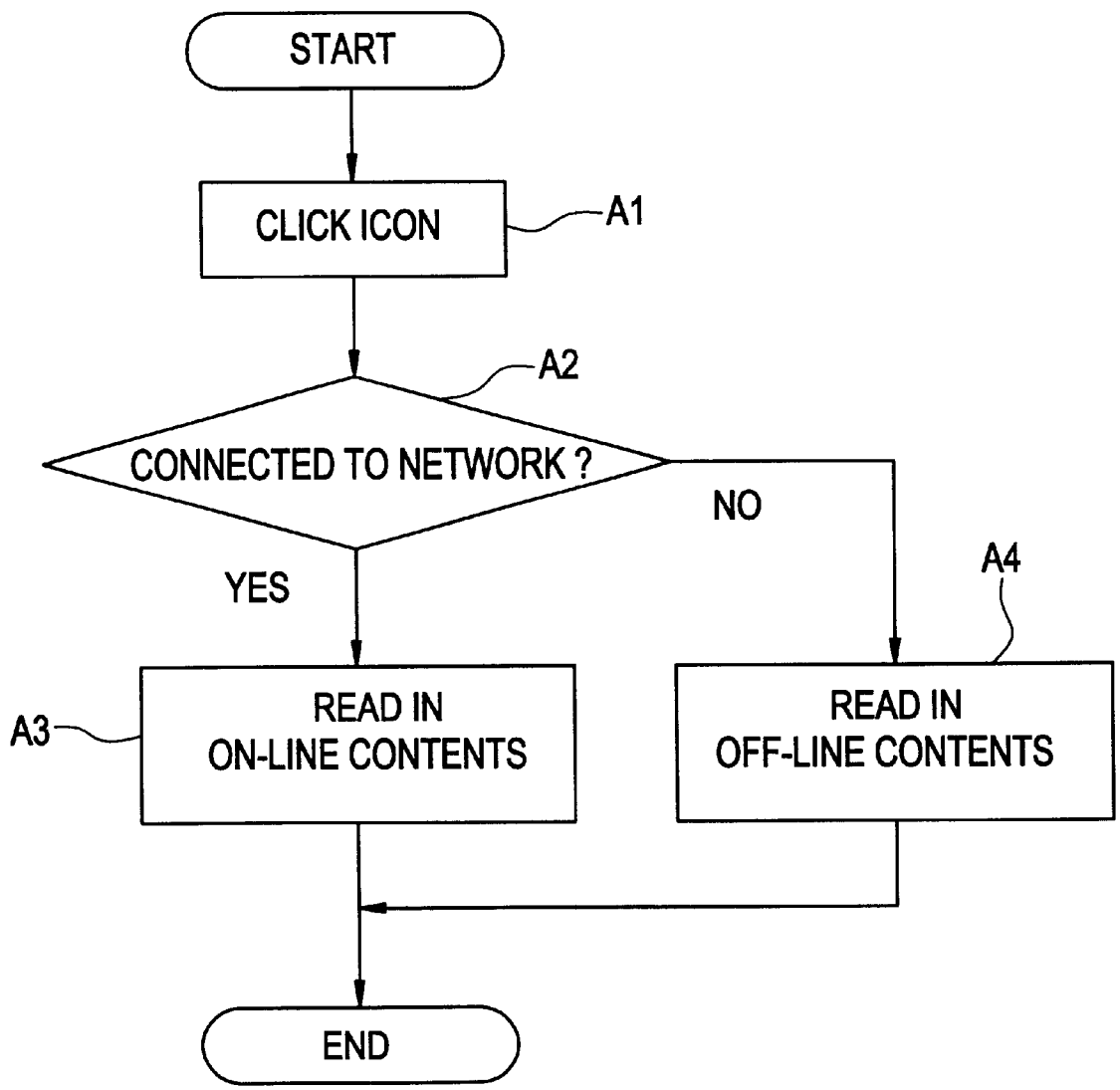
FIG. 2 is a flow chart for explaining the operation of the first embodiment of the invention.

Referring to FIG. 2, when the user clicks an icon which is displayed on the display unit 13 by the input unit 14 (step A1), the information processing unit 11 determines whether or not the terminal 10 and the center 20 are on-line connected to each other by a communication network (step A2)

If the terminal 10 and the center 20 are found to be on-line connected by a communication network, the terminal 10 reads out on-line contents corresponding to the clicked icon stored in the memory unit 21 of the center 20, and displays the contents, detailed advertising information such as the home page, on the display unit 13 (step A3).

On the other hand, if the terminal 10 and the center 20 are not connected to each other by any communication network, the terminal 10 cannot read out the on-line contents, the terminal 10, therefore, reads out off-line contents corresponding to the clicked icon stored in advance in the memory 12 of the corresponding terminal 10, and displays it on the display unit 13 (step A4). These steps A1 through A4 are processed by storing a control program for their processing in the memory unit 12 and causing the information processing unit 11 to read this control program in.

Here, a connection setting program may as well be stored in the memory unit 12 in advance of the time of the shipment of the terminal 10, and be executed after step A4 or clicking the icon by the user. The connection setting program is for entering into a contract with an Internet service provider, and making a setting for connection to the Internet in the terminal 10 automatically, only when the user agrees.

Next will be described the addition to, updating of and deletion from the icon data and the matching off-line contents stored in the memory 12 of the terminal 10 according to the above-described alteration program. As explained above, the icon data and the off-line contents, which the terminal receives, are stored in the memory 22 of the center 20.

First, the center 20 transmits above-mentioned instruction to the terminal 10 for adding to, updating of and deleting the icon data and the matching off-line contents under on-line condition.

Then, in case that the terminal 10 receives the instruction for adding to or updating of the icon data and matching off-line contents, the terminal 10 accesses the center 20, and accomplishes addition to or updating of the icon data and the matching off-line contents stored in the memory 12 in accordance with the alteration program 15.

On the other hand, in case that the terminal 10 receives the instruction for deleting the icon data and matching off-line contents, the terminal 10 deletes them.

The user, of course, can delete any of the icon data stored in the terminal 10 in which he or she has no interest. In this case, together with the deletion of the icon data, the matching contents for off-line communication may also be deleted.

It may as well that the center 20 restricts addition, updating and the like by using the access history. For example, the icon that the matching off-line contents are not referenced to is not updating. Or the icon that the matching off-line contents are not referenced to while predetermined period is updating primarily.

It may also as well that the user can set the alteration program for an alteration mode, which means addition and updating of icon data and off-line contents are always desired, or a non-alteration mode, which means neither addition nor updating is desired.

Next will be described how the center 20 acquires the access history of each version of each icon at each of the terminals 10.

First, the center 20, at a request for transmission from a terminal 10 in accordance with the alteration program described above, adds icons and/or upgrades the version of each icon, and accordingly it can keep track of the changing state of each icon at each of the terminals 10 over time.

In addition, the center 20 can also know the history of which terminal referred on-line contents and when, and therefore find out in real time which icon is urging users to click it more keenly than others.

Further, when a terminal 10 has referred off-line contents, the history of reference may be stored into the memory 12 of the terminal 10, and may be transmitted to the center 20 at a prescribed timing.

Although the center 20 cannot receive this history in real time, in this manner the management unit 22 can total the history of reference to on-line contents and of reference to off-line contents to enable the center 20 to keep track of the history (the number of times) of clicking by the user.

Information on the aforementioned access history, which the center 20 keeps track of, is stored into the memory 21 of the center 20.

Figure 5:
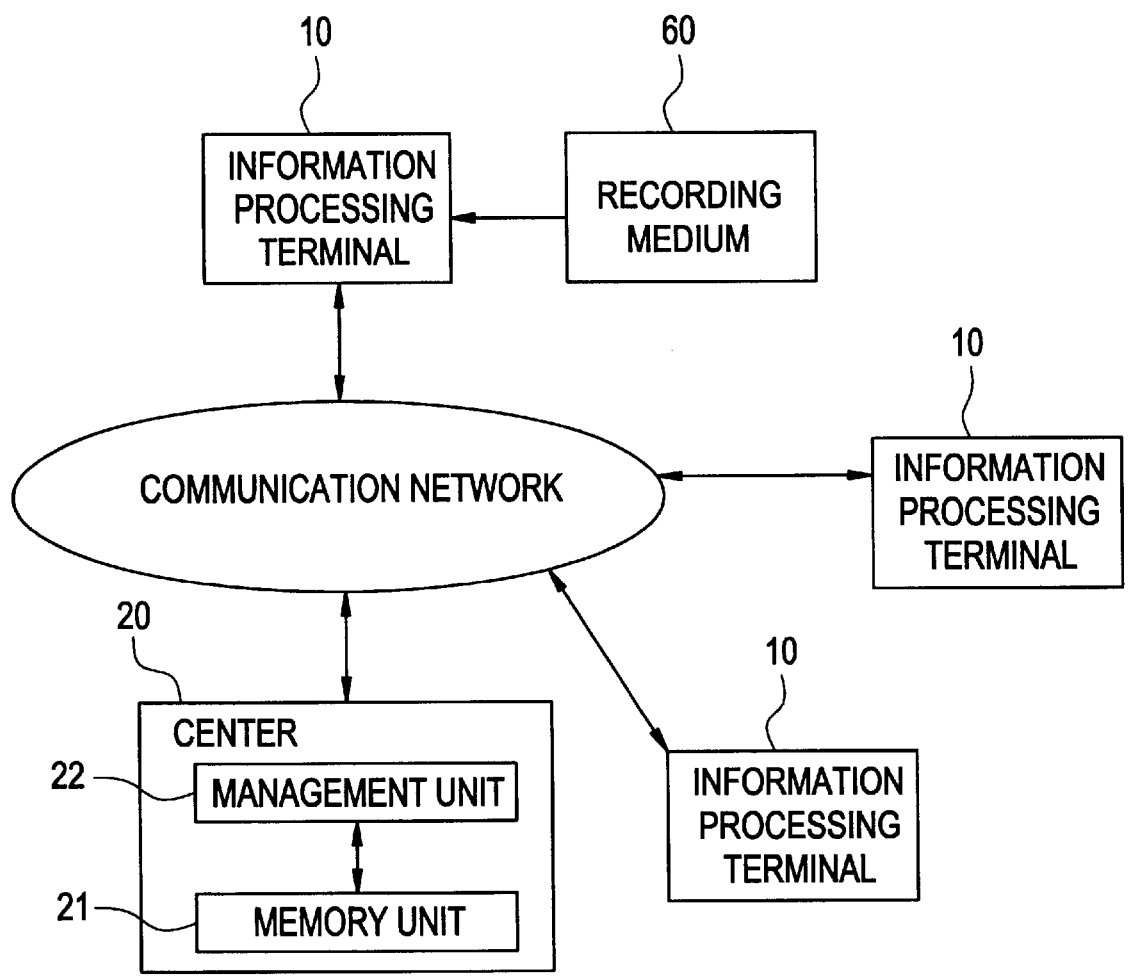
FIG. 5 is a block diagram illustrating a first embodiment of an advertising system of the present invention.

Further, referring to FIG. 5, in the first embodiment, the aforementioned control program, alteration program and connection setting program are stored in a recording medium 60. In this case, the terminal 10 reads in the contents of this recording medium, the same operation as that of the above-described first embodiment will result. It may as well that the recording medium stores the icon data and the off-line contents.

Next will be described a second embodiment of advertising system of the present invention. In the following description of this embodiment, explanation of those constituent elements which operate in the same way as their respective counterparts in the first embodiment will be dispensed with, and only other elements which operate differently will be described in detail.

Figure 3:
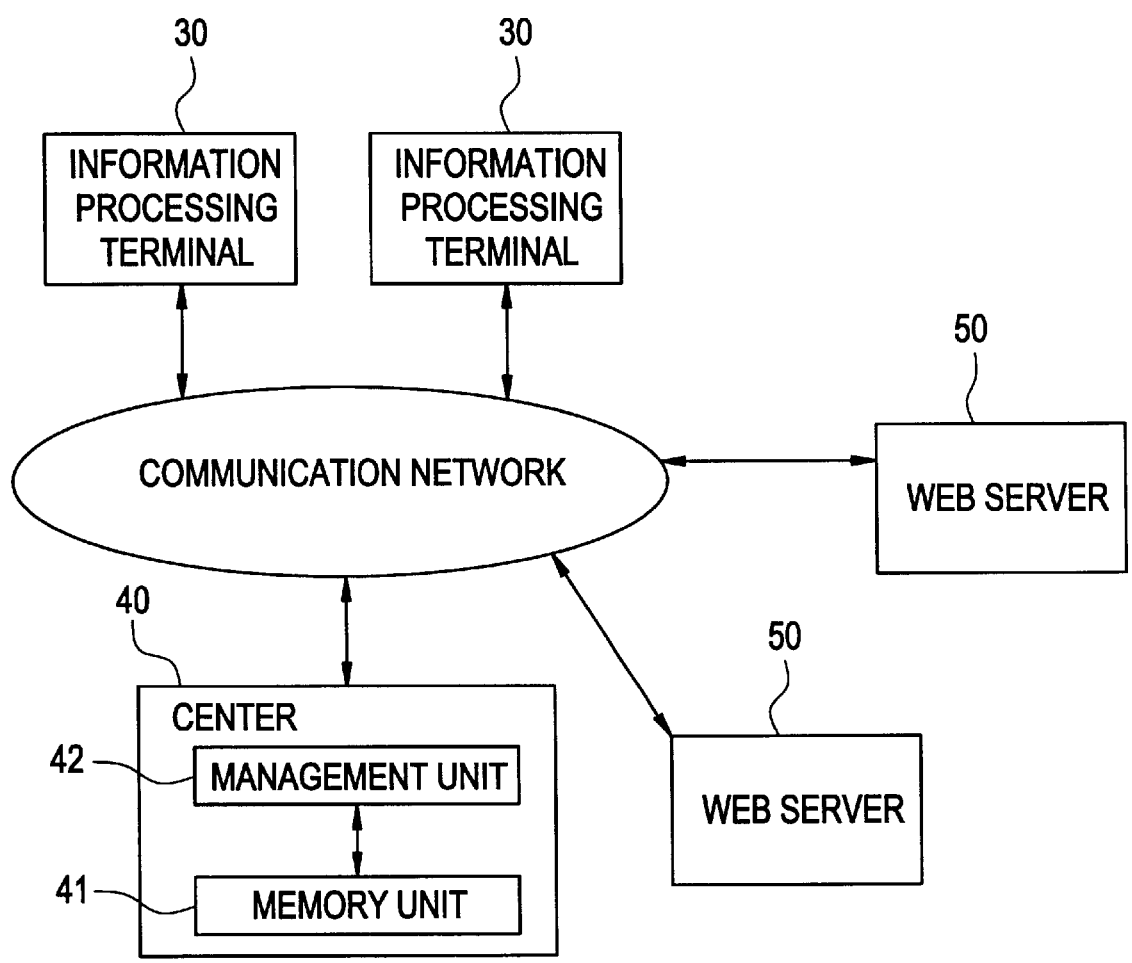
FIG. 3 is a block diagram illustrating a second preferred embodiment of the invention.

Referring to FIG. 3, the advertising system of the second embodiment includes a plurality of terminals 30, a center 40 and a plurality of web servers 50 are connected to a communication network.

The terminal 30 has basically the same configuration as a terminal 10 in the first embodiment, though somewhat differing in the programs to be stored in its memory to be described later on.

The web server 50 is a usual web server, and stores on-line contents.

The center 40 includes a memory unit 41 and a management unit 42.

The memory 41 stores icon data and off-line contents matching the icon data for transmitting to the terminal 30, and access history information (similar to that in the first embodiment), and address information of on-line contents matching each icon. The address information can be altered as appropriate.

Next, the operation of this embodiment will be described, referring to FIG. 4.

Figure 4:
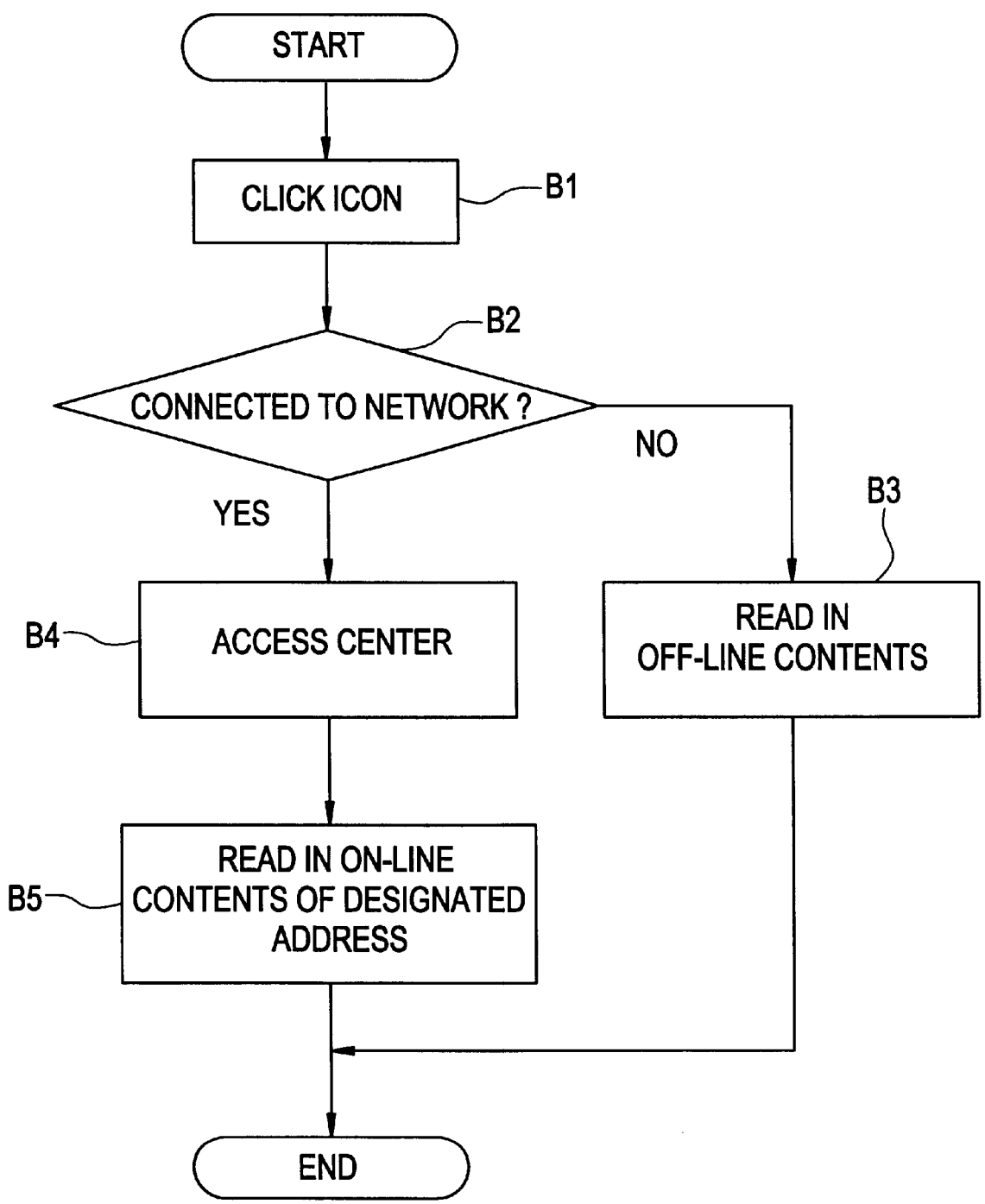
FIG. 4 is a flow chart for explaining the operation of the second embodiment of the invention.

Referring to FIG. 4, when the user clicks an icon displayed on the display unit (step B1), the terminal 30 determines whether or not the terminal 30 and the center 40 are on-line connected to a communication network (step B2).

In the case that the terminal 30 and the center 40 are connected to no communication network, the terminal 30 being under off-line condition, as does its counterpart in the first embodiment, displays contents for off-line communication (step B3).

On the other hand, in the case that the terminal 30 and the center 40 are on-line connected to the communication network, the terminal 30 first accesses the center 40, and transmits information indicating the clicked icon to the center 40 (step B4). Thus, one of the link destinations included in the icon data is the center 40. The rest of the operation will be described below.

The management unit 42 of the center 40, linked by the clicking of an icon at the terminal 30, finds out which icon was clicked, and transmits address information, to which on-line contents corresponding to the clicked icon is located, to the terminal 30.

The terminal 30, which receives this address information, accesses that address, and reads in the contents at the address, and displays them on the display unit (step B5).

The processing of these steps B1 through B5 may as well be accomplished by storing a control program in advance in the memory of the terminal 30 and causing the information-processing unit of the terminal 30 to read this program in.

Processing of alterations including addition to, updating of and deletion from the icon data and the matching off-line contents stored in the memory unit of the terminal 30, as in the first embodiment, may be accomplished by causing the information processing unit of the terminal 30 to read out the aforementioned alteration program.

Figure 6:
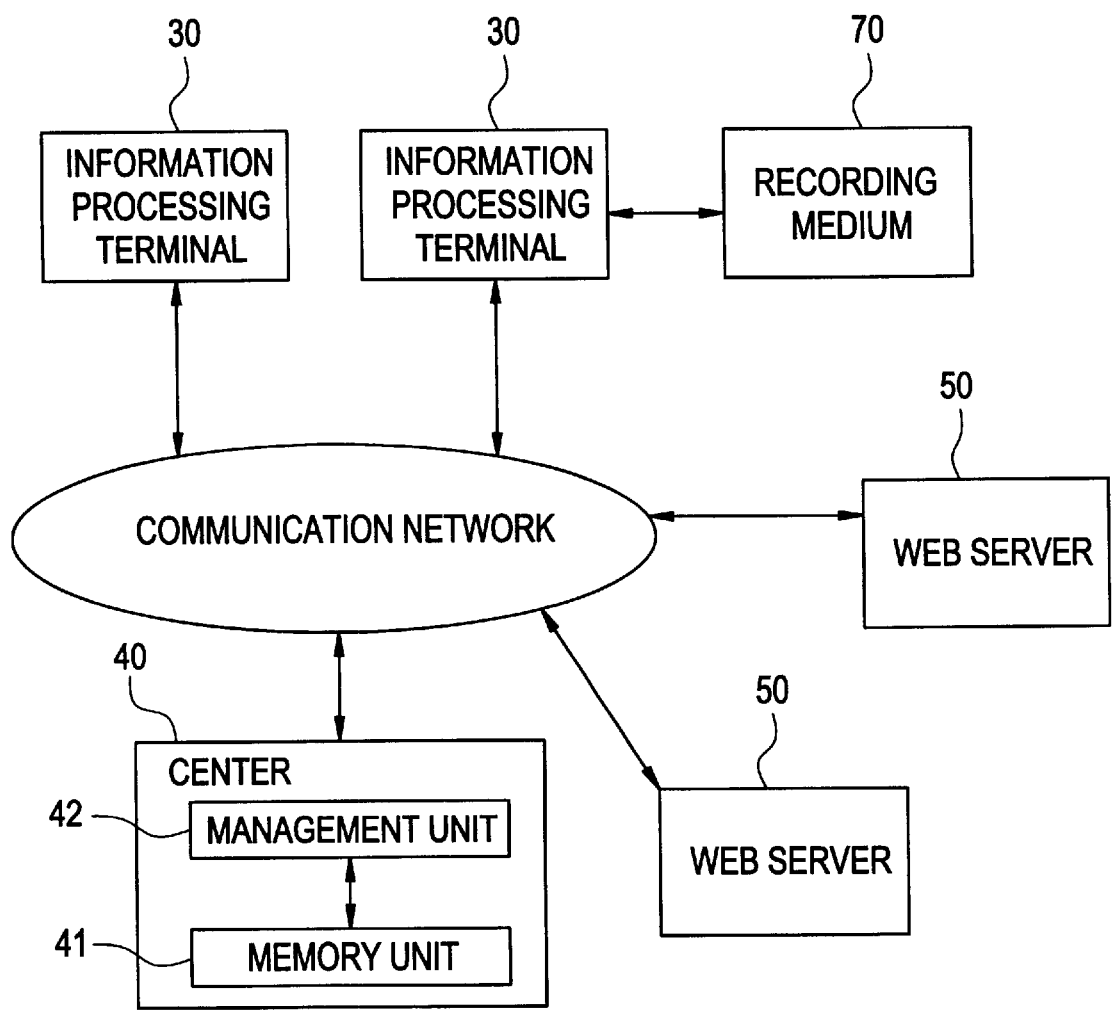
FIG. 6 is a block diagram illustrating a second preferred embodiment of the invention.

Furthermore, as shown in FIG. 6, if in the second embodiment the aforementioned control program, alteration program and connection setting additional program are stored into a recording medium 70 and the terminal 10 reads in the contents of this recording medium 70, the same operation as that of the above-described first embodiment will be carried out.

Thus, in the second embodiment of the invention, if an icon is clicked when the terminal 30 is on-line connected to a communication network, the terminal 30 will access the center 40 without fail, even if web servers ultimately linked to by icon clicking are scattered on the network, the center 40 can readily acquire the history of accesses from the terminal 30.

Furthermore, the ultimate link destination of an icon can be readily altered by rewriting the address information stored in the memory 41 of the center 40.

To add, icons in the above-described first and second embodiments may be any graphics that can be displayed in a prescribed display area of the display unit. Nor there is any restriction on the type of contents only if they are data that can be transmitted and received via a network. The present invention can as well be applied to the conventional advertising system referred to earlier. Link information to be contained in the icon data, though there were two types in the above-described embodiments, each terminal may have a plurality of link destination depending on the type and state of the communication network it is connected to.

As hitherto described, the present invention has the advantage of enabling advertisements to be more effective than according to the prior art, because contents for off-line communication can be displayed when a terminal is connected to no network.

While this invention has been described in conjunction with the preferred embodiments described above, it will now be possible for those skilled in the art to put this invention into practice in various other manners.

What is claimed is:

1. A information processing terminal comprising:
   a memory unit which stores at least one set of icon data and contents for off-line communication;
   an information processing unit which determines whether said terminal is under on-line or off-line condition; and
   a display unit which displays, based on said icon data, an icon in which both two type of link information is embedded, one of said link information being for linking to said contents for off-line communication, and another being for linking to outside contents for on-line communication,
   wherein said terminal accesses said outside contents for on-line communication in response to clicking said icon by a user, and said display unit displays said outside contents for on-line communication, when said information processing unit determines that said terminal is under on-line condition, and
   wherein said terminal accesses said contents for off-line communication in response to clicking said icon by said user, and said display unit displays said contents for off-line communication, when said information processing unit determines that said terminal is under off-line condition.

2. A information processing, terminal as claimed in claim 1, wherein said outside contents is stored in a center connected to a communication network.

3. A information processing terminal as claimed in claim 1, wherein said icon data and said contents for off-line communication are stored in said memory unit before shipping to a customer.

4. A information processing terminal as claimed in claim 1, wherein said icon works as advertisement, and said off-line and on-line contents includes information which is related to said advertisement.

5. A information processing terminal as claimed in claim 4, wherein said center acquires history of clicking icon by said user.

6. A information processing terminal as claimed in claim 1, wherein said information processing unit modifies at least one of said icon data, and said contents for off-line communication by using the corresponding one of an updated icon data or updated contents which are received via a communication network.

7. A information processing terminal as claimed in claim 1, wherein said information processing unit adds new icon data and contents for off-line communication which are received via a communication network.

8. An advertising system comprising:
   a communication network;
   a information processing terminal which includes a memory unit which stores at least one set of icon data and contents for off-line communication, an information processing unit which determines whether said terminal is under on-line or off-line condition, and a display unit which displays, based on said icon data, an icon in which both two type of link information is embedded, one of said link information being for linking to said contents for off-line communication, and another being for linking to contents for on-line communication; and
   a center which stores said on-line contents and is connected to said communication network,
   wherein said terminal accesses said contents for on-line communication in response to clicking said icon by a user, and said display unit displays said contents for on-line communication, when said information processing unit determines that said terminal is under on-line condition, and
   wherein said terminal accesses said contents for off-line communication in response to clicking said icon by said user, and said display unit displays said contents for off-line communication, when said information processing unit determines that said terminal is under off-line condition.

9. An advertising system as claimed in claim 8, wherein said icon works as advertisement and said off-line and on-line contents includes information which is related to said advertisement.

10. An advertising system as claimed in claim 8, wherein said center stores at least one of icon data and contents for off-line communication, which is for adding to or updating of icon data and contents for off-line communication stored in said memory unit, and transmits said at least one of icon data and contents to said terminal,
    and wherein said terminal stores said at least one of icon data and contents in said memory unit.

* * * * *